United States Patent [19]

Cheung

[11] Patent Number: 4,799,200
[45] Date of Patent: Jan. 17, 1989

[54] METHOD OF ACOUSTICALLY DETECTING FRACTURES IN A BOREHOLE

[75] Inventor: Philip S. Cheung, New Fairfield, Conn.

[73] Assignee: Schlumberger Technology Corporation, Houston, Tex.

[21] Appl. No.: 789,533

[22] Filed: Oct. 21, 1985

[51] Int. Cl.$^4$ ............................................. G01V 1/24
[52] U.S. Cl. ......................................... 367/30; 367/35
[58] Field of Search ..................... 367/30, 29, 31, 34, 367/35; 33/307; 364/422

[56] References Cited

U.S. PATENT DOCUMENTS

| | | | |
|---|---|---|---|
| 3,050,150 | 8/1962 | Tixier | 367/30 |
| 3,205,941 | 9/1965 | Walker | 367/30 X |
| 3,356,177 | 12/1967 | Loren | 367/30 |
| 3,406,766 | 10/1968 | Henry | 367/30 X |
| 3,474,878 | 10/1969 | Loren | 367/35 X |
| 3,775,739 | 11/1973 | Vogel | 367/75 |
| 4,280,200 | 7/1981 | Silverman | 367/37 |

OTHER PUBLICATIONS

"Acoustic Propagation in the Vicinity of Fractures which interest a Fluid-Filled Borehole"; Frederick L. Paillet; SPWLA 21st Symposium, Jul. 1980.
"Applications of Median Filtering to Deconvolution, Pulse Estimation, and Statistical Editing of Seismic Data"; J. Bee Bednar; Geophysics, vol. 48, No. 12; Dec. 83.
"Using Compressional and Shear Amplitudes for the Location of Fractures"; R. L. Morris et al., SPE Fall Meeting Paper; New Orleans; Oct. 1963.
"Investigation of Acoustic Boundary Waves & Interference Patterns as Techniques for Detecting Fractures"; E. A. Koerperich; SPE-AIME; Aug. 1978.
"Formation Compressional and Shear Interval-Transit-Time Logging Means of Long . . . "; J. Aron et al.; SPE of Aime Meeting Paper; Oct. 1978.

*Primary Examiner*—Thomas H. Tarcza
*Assistant Examiner*—Tod R. Swann
*Attorney, Agent, or Firm*—Henry N. Garrana

[57] ABSTRACT

According to the method an acoustic transmitter/receiver tool is lowered in measured manner down a borehole. The tool possesses separate transducers for transmitting and receiving sound waves and includes at least one pair of spaced apart transmitter and receiver spacing. As it is lowered, the tool is caused to repetitively transmit sound waves and on each occasion the waveforms of the echoes received by the tool are recorded in relation to the spacing. Fractures are detected by processing portions of the waveforms which are representative of at least one of two different local effects corresponding to fractures, which effects are amplitude peaks due to a local increase in acoustic coupling, and criss-cross patterns due to mode conversion.

6 Claims, 12 Drawing Sheets

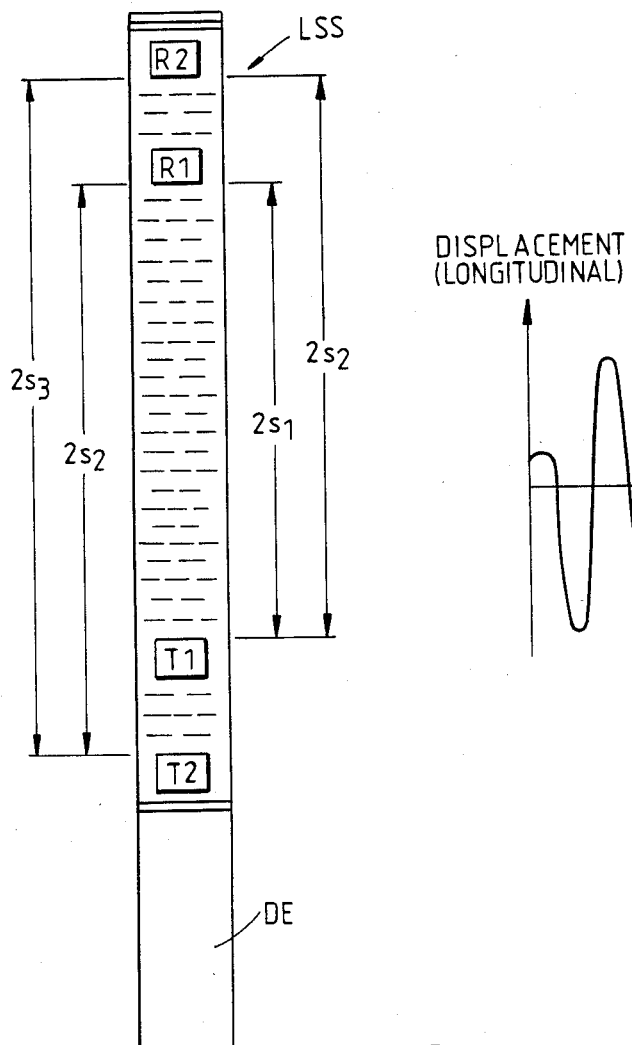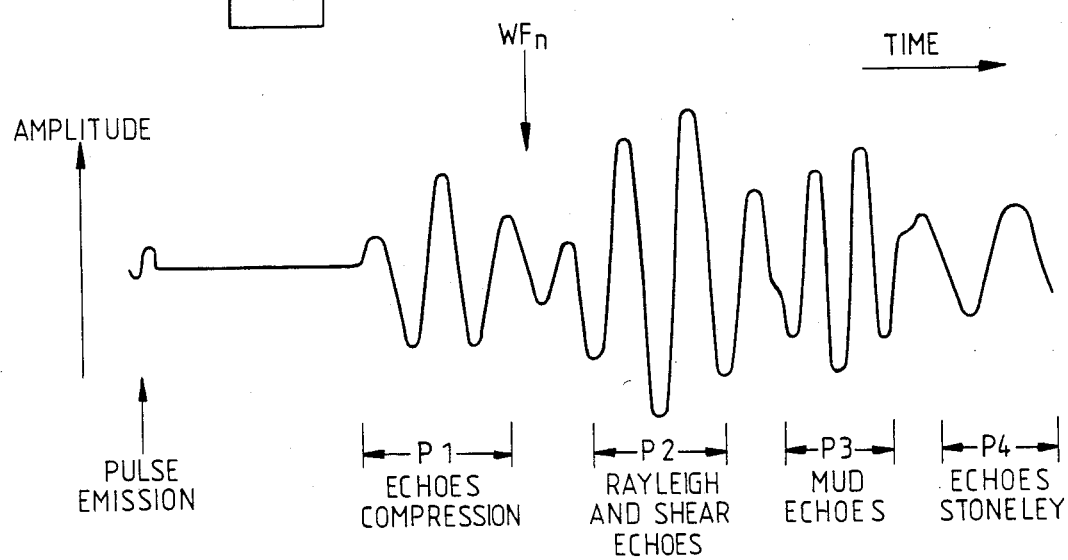

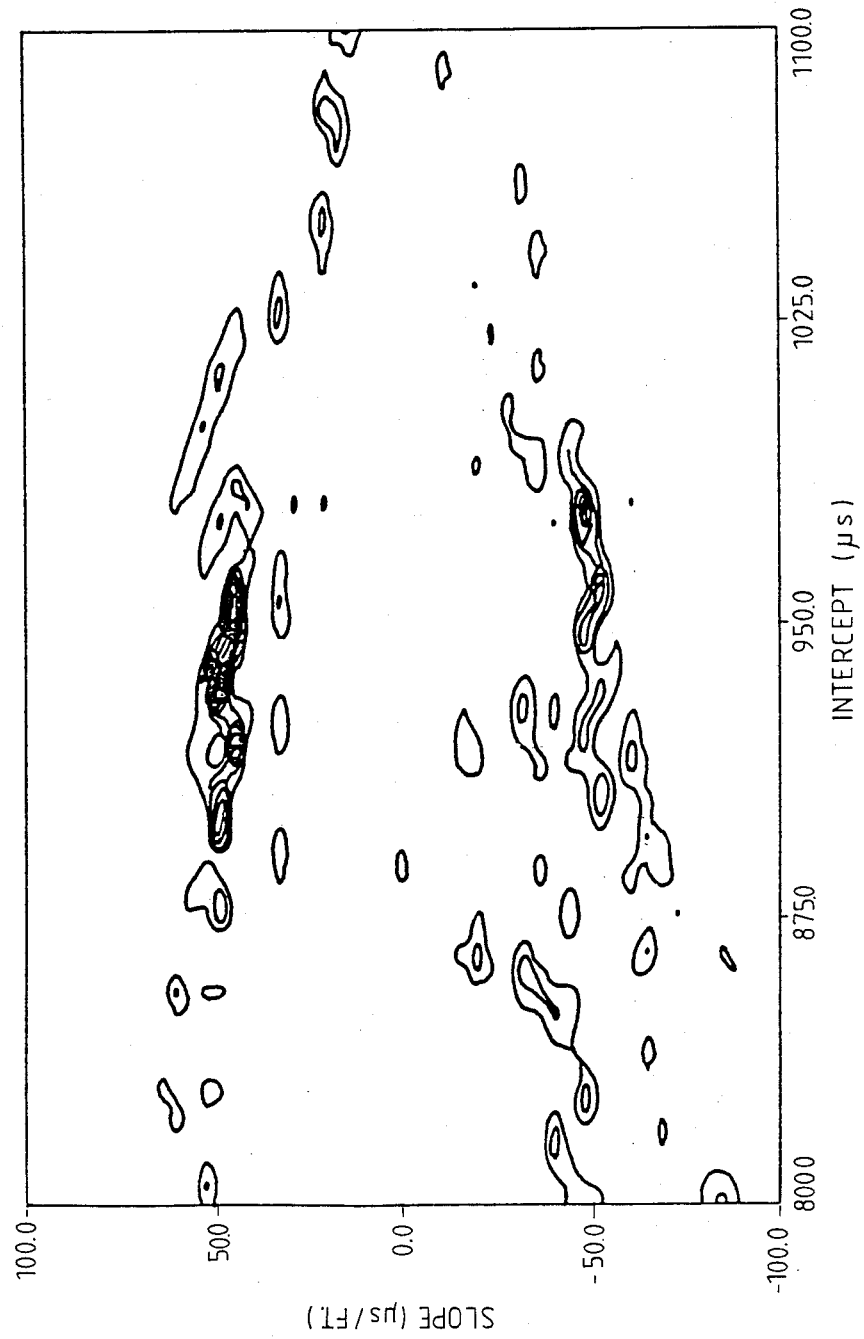

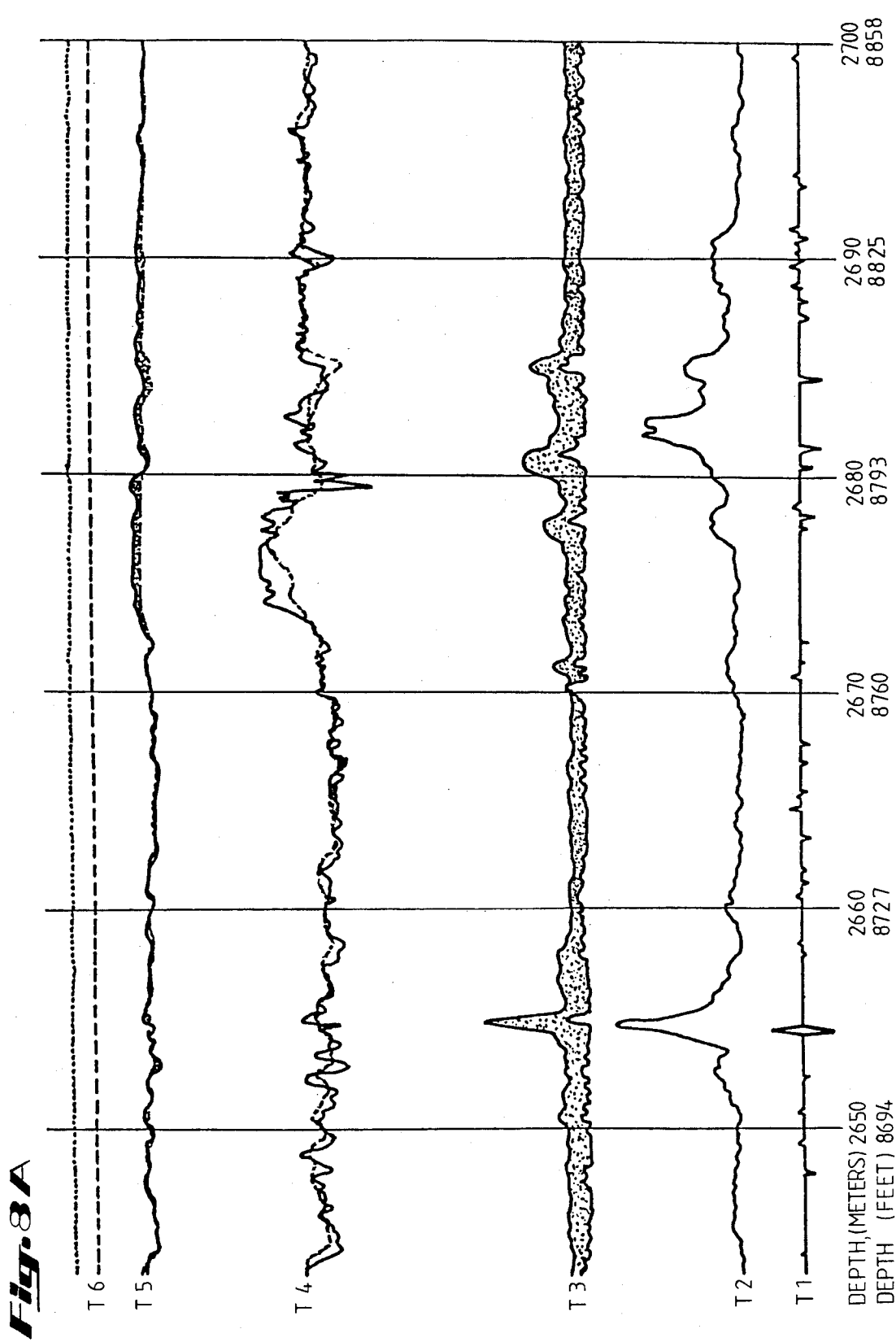

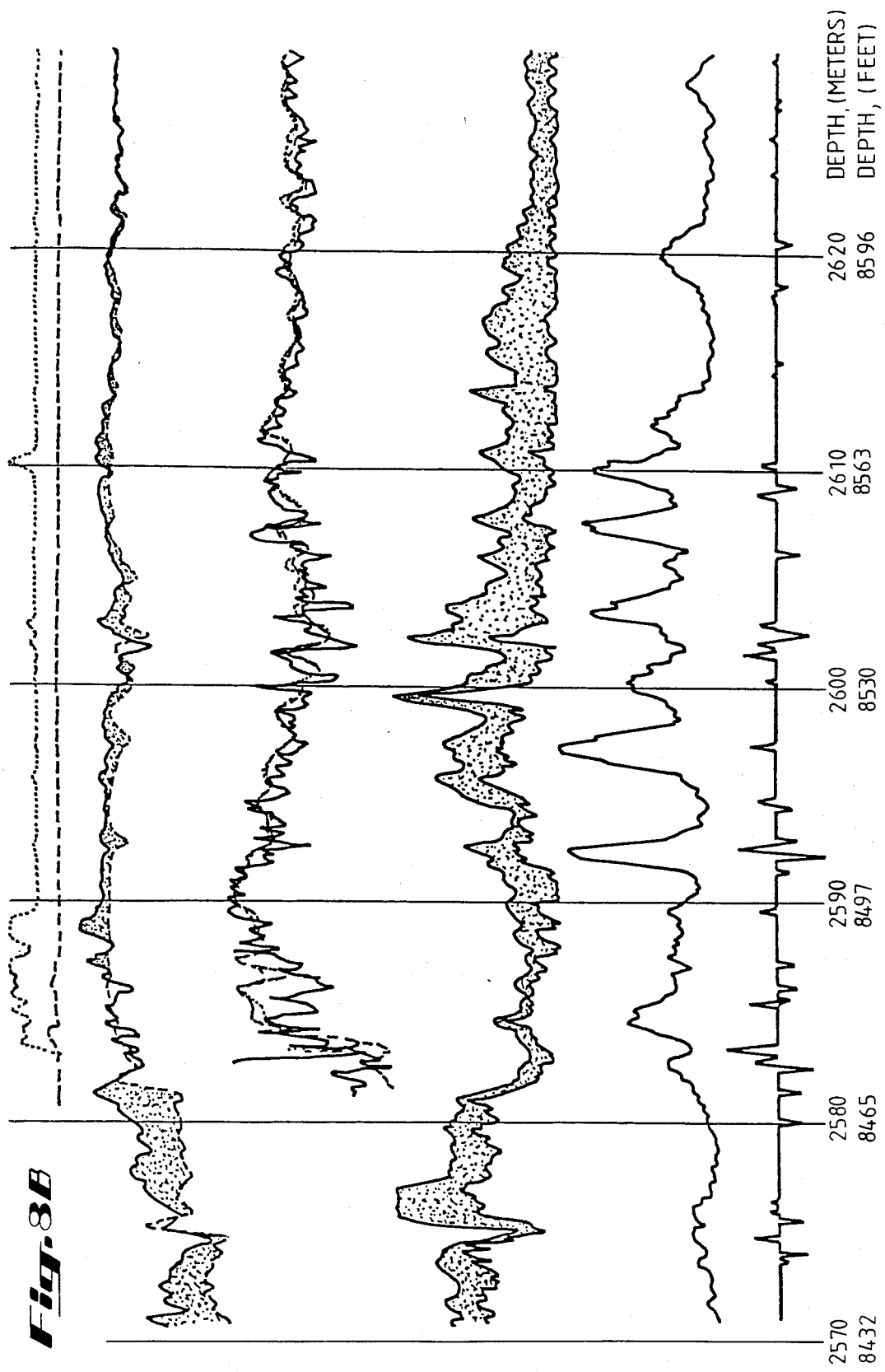

METHOD OF ACOUSTICALLY DETECTING FRACTURES IN A BOREHOLE

BACKGROUND OF THE INVENTION

The invention relates to detecting fractures present in underground earth formations having a borehole drilled therethrough.

There are several reasons for the desirability of detecting fractures in oil prospecting, the most important of which being that fracture zones have a high chance of constituting hydrocarbon production zones. The fracture system usually provides a high permeability path and consequently constitutes an effective draining mechanism through reservoir rock which is generally dense and of low permeability.

Many currently known tools are capable, after suitable interpretation of their measurements, of giving indications of the presence of fractures but not in a really satisfactory manner.

Of the available tools, particular attention has been given to sonic tools which transmit and receive sound waves. Tests have been performed in order to evaluate the possibility of practical fracture detection using such a tool. In this respect, reference is made to the following publications: R. L. Morris, D. R. Grine and T. E. Arkfeld, 1964 "The use of compressional and shear acoustic amplitudes for the location of fractures", J. Pet. Tech., 16, 623–635; E. A. Koerperich, 1978 "Investigation of Acoustic Boundary Waves and Interference Patterns as Techniques for Detecting Fractures", J. Pet. Tech., 30, 1199–1207; and F. L. Paillet, 1980 "Acoustic Propagation in the Vicinity of Fractures which intersect a Fluid-filled Borehole", Proceedings SPWLA Symposium, 1980, paper DD.

These previously known methods make heavy use of a qualified expert interpreting a suitable representation of the measurements performed by a particular sonic tool. The person skilled in the art will readily recognize the drawbacks of such an approach.

SUMMARY OF THE INVENTION

It is highly desirable to be able to detect fractures automatically, reliably, and with as little ambiguity as possible.

The main aim of the present invention is to provide means for achieving this object.

One of the aims of the present invention is to mitigate the drawbacks of prior techniques for detecting fractures by the amplitude attenuation of the sound waves.

Another aim of the invention is to identify fractures with depth resolution which is better than the spacing between the sound transmitter and the sound receiver.

An additional aim of the invention is to provide objective evaluation of multiple path configurations to enable fracture identification.

Yet another aim of the invention is to provide experts with improved data and/or diagrams of the measurements in order to take advantage of the greater accuracy provided by the invention.

The proposed method comprises the following steps of:

(a) lowering a sonic tool for transmitting and receiving sound waves down a borehole while monitoring the depth of the tool in the borehole. The tool is provided with separate transducers for transmission and for reception of sound waves at at least one known transmitter to receiver spacing. The tool transmits sound waves repetitively as it is lowered, and each time recording the shape of the resulting echo wave received by a given transducer. The echoes result from acoustic coupling between the tool and the formations through the fluid filling the borehole.

Generally speaking, the invention is characterized in that fractures are detected by processing portions of the echo waveforms which are representative of at least one of two local effects correlated with fractures, namely amplitude peaks due to a local increase in acoustic coupling, and criss-cross patterns due to mode conversion.

According to a first aspect of the invention, the method, in addition to the above two steps, further includes the following steps:

(b) extracting a compressional amplitude signal from a selected window in each echo waveform, the window containing compression wave echoes, thereby providing at least one compressional amplitude curve as a function of depth associated with a transmitter-to-receiver spacing;

(c) isolating amplitude peaks of width close to a predetermined value from the compressional amplitude curve, thereby providing at least one curve of amplitude peaks; and (d) determining the presence of fractures from the identified amplitude peaks curves.

This may be called "amplitude peak analysis". Preferably:

the first step consists in lowering down the borehole a tool suitable for operating simultaneously over a plurality of spacings, with sn designating half the spacing (where n=1 to m), the second step comprises selectively recording the echo waveforms received for each transmission and for each spacing, Steps (c) and (d) are selectively executed for each spacing providing a set of compressional amplitude curves respectively associated with corresponding ones of the spacings; and step (e) comprises: determining two cross-correlation coefficient curve T(z) and R(z) as a function of steps using the equations:

$$<T(z)> = \prod_{n=1}^{m} <P_n(z - s_n)>;$$

and $$<R(z)> = \prod_{n=1}^{m} <P_n(z - s_n)>$$

where sn=one half of the transmitter receiver pair spacing; z=borehole depth of the midpoint between transmitter receiver; Pn=amplitude peaks curves; and An(z)=compression amplitude curve, and determining the presence of fractures from the peaks of the curves T(z) and from the peaks of the curves R(z).

Most advantageously, step (d) comprises:

determining smoothed curves Mn(z) by using a moving average filter on each of the amplitude curves An(z); and determining the peak curve Pn(z) by subtraction of Mn(z) from An(z), where: Pn(z)=An(z)−Mn(z) if An(z)>Mn(z) and Pn(z)=0 otherwise.

In a particular implementation of the smoothing step the moving average filtering is performed by means of a median filter operating on 5 points, with sound transmission being repeated about every 15 cm.

In practice, the predetermined value for the width of amplitude peaks corresponds to about one wavelength of the acoustic compression wave in the subsoil, and in particular to 0.3 meters for an acoustic wave at 16 kHz.

Further, it is desirable for m to be equal to at least 3.

According to other features of the inventions the magnitude An in the compressional amplitude extraction step is defined by the peak-to-peak amplitude maximum of the echo waveform (WFn) over a portion at least of the window containing echoes of compressional waves.

The compressional amplitude magnitude is logarithmic in nature.

For observation by a expert, the determination of the presence of fractures in step (e) includes establishing an diagram which simultaneously shows curves T(z), R(z) and preferably Pn(z) as a function of depth.

According to another aspect of the invention, the processing relating to the criss-cross pattern comprises determining the amplitude or the energy thereof relative to the amplitude or the energy of direct echoes.

Most advantageously, the portions of the waveforms taken into account are the portions due to compressional waves which end with the first echo of the shear wave type, i.e. pseudo-Rayleigh waves.

More precisely, the criss-cross pattern processing comprises summing the amplitudes taken from the waveforms at the expected positions of the two arms of a criss-cross pattern within a window that covers the transmitter-to-receiver spacing, in order to determine the total energy EX of the echoes on both arms of the criss-cross patterns, the presence of a fracture being determined from the difference of this total energy relative to zero.

The total energy EX is preferably determined as the geometric mean of energies E+, and E− taken from each arm.

S(t,p) is used to denote the square of the sum of the amplitudes about a line which intersects time t and having slope p. The energies on the rising arm E+ and on the falling arm E− of the criss-cross pattern may be determined by the equations:

$$E+ = sum\ S(t,p)/N+ (p>0)$$

where N+ is the product of the number of levels or samples in the summing window multiplied by the number of "rising" summing lines under consideration and $$E- = sum\ S(t,p)/N- (p<0)$$

where N− is the product of the number of levels or samples in the summing window multiplied by the number of "falling" summing lines under consideration.

Under these conditions, the range of values of t that is used coincides with the compressional echo window, while the range of values for p coincides with the slope of the lines joining the compression echoes to the shear echoes.

In a particular implementation of the invention, the processing relating to the criss-cross patterns comprises the following steps:

defining a summing window covering the transmitter-to-receiver spacing and extending between the compression echoes and the rise of the first pseudo-Rayleigh or shear echo;

normalizing the amplitude of each wave form relative to the largest amplitude direct echo which it contains;

eliminating the direct echoes by median filtering in the depth direction;

determining the summed amplitudes as defined above for a chosen set of summing lines having time slopes and intersections which correspond to a criss-cross pattern in the said window;

determining the magnitude E+, E− and EX as defined above, and repeating the above steps for the various possible admissible positions of the summing windows.

The method may then be finished off by displaying the intensity of the criss-cross patterns, or better by simultaneously displaying data derived from the local evaluation of acoustic coupling and from the criss-cross patterns.

Other characteristics and advantages of the invention will appear from an examination of the following detailed description and the accompanying drawings, in which;

BRIEF DESCRIPTION OF THE DRAWINGS

FIG. 1 is a diagrammatic illustration of an LSS tool suitable for performing the invention;

FIGS. 2A and 2B are waveform diagrams respectively showing a transmitted waveform FE and an echo waveform WFn;

FIG. 7 shows some result obtained by the FIG. 6 method; and

FIGS. 8a and 8b show the results obtained by simultaneously implementing the methods which form the two aspects of the present invention.

DETAILED DESCRIPTION OF THE INVENTION

Figure 3:
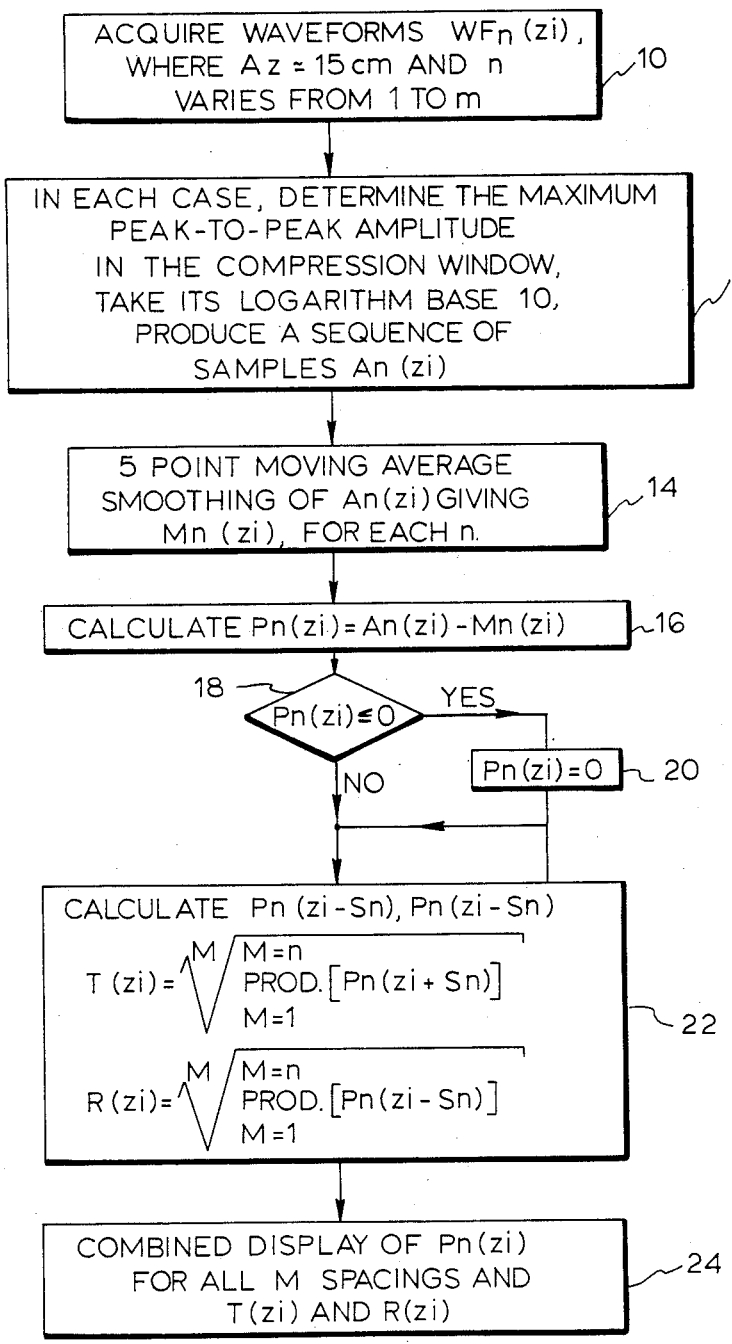
FIG. 3 is a flowchart showing the various steps for performing the method of analysis using amplitude peaks in a particular implementation of the method.

Broadly speaking the accompanying drawings show information which can only be shown in a drawing. They are thus incorporated in the present description not only to enable the invention to be understood, but also to contribute, where applicable, to defining the invention.

FIG. 1 illustrates a Long Spacing Sonic Sonde (LSS) for transmitting and receiving sound waves.

This tool includes two axially-spaced acoustic transmitters T1 and T2 which are theoretically omnidirectional in the sideways direction. Axially-spaced from the transmitters there are two acoustic receivers R1 and R2 which are also omnidirectional. Below the transmitters, there is a device having an overall reference DE and suitable for triggering transmission and echo recording.

This tool serves to define several spacings, namely: a first spacing 2.s1 between the transmitter T1 and the receiver R1;

another spacing 2.s2 between the transmitter T1 and the receiver R2 and also between the transmitter T2 and the receiver R1;

and a third spacing 2.s3 between the transmitter T2 and the receiver R2.

The half spacings s1, s2 and s3 may have the following values, for example, 4 feet (1.22 meters), 5 feet (1.52 meters) and 6 feet (1.83 meters).

FIG. 2A shows the transmission waveform which is applied to each of the transmitters T1 and T2. This waveform is applied successively to the transmitters, at instants which are sufficiently far apart to avoid any interference at the receivers R1 and R2, but which are also sufficiently close to together for it to be possible to consider that the echoes obtained relate to the same depth, given the rate at which the tool is moving. Further, the rate at which the two transmitters are sequentially triggered is chosen so that data is obtained substantially every 15 centimeters in the depth direction.

The transmitters T1 and T2 produce acoustic compression waves also known as longitudinal waves, as opposed to shear waves or transversal waves. It is only longitudinal waves that are suitable for passing through the fluid which fills the borehole without excessive attenuation.

Likewise, the receivers R1 and R2 receive echoes in the form of longitudinal waves via the borehole fluid. However, interaction between the wall of the borehole and the subsoil may cause these waves to correspond to various other types of waves propagating in the subsoil.

Thus, FIG. 2B shows the waveform WFn of a received signal after a pulse has been transmitted. This waveform begins with a portion p1 which relates to compression waves, due in particular to compression waves travelling back and forth within the fluid contained in the borehole after reflection on the wall thereof.

There follows a section p2 of the waveform WFn comprising shear waves which are also known as Rayleigh waves. A significant portion of the signal transmitted as a compression wave enters the subsoil and propagates therethrough in the form of shear waves which are capable of penetrating into solid material and also in the form of so-called Rayleigh waves which propagate in the vicinity of a solid/liquid or solid/gas interface. These waves can be distinguished from each other by different propagation speeds thus giving rise to different durations in their alternations. There also exist so-called pseudo-Rayleigh waves which appear because acoustic energy tends to move away from the interface (giving rise to Rayleigh waves) as soon as compression waves are established in the drilling mud. The portion p3 of the waveform WFn then shows the appearance of so-called mud echoes.

The person skilled in the art knows that unlike compression waves and shear waves which propagate through an infinite medium, Rayleigh waves and pseudo-Rayleigh waves only propagate in a finite medium, i.e. they are guided waves.

A third type of guided waves appears in a borehole and can be seen in portion p4 of the waveform WFn. These are Stoneley echoes or waves which are set up in the mud by the mud interacting with the subsoil formations. The lowest frequencies of the Stoneley waves are also known as tubular waves.

Proposals have already been made to use the attenuation which appears in the waveforms recorded by a sonic tool in order to locate fractures present in the subsoil However, it will be readily understood, taking account of the large number of different types of waves involved, that interpreting such measurements is very difficult.

The applicant has observed, in particular, that the attenuation of the received signal may equally well be produced by fractures as by other inhomogeneities in the formation. Further, the depth resolution which could be obtained by studying attenuation is relatively modest.

There follows a description with reference to FIG. 3 of a method which provides a considerable improvement in fracture detection. This method is based on a local elevation in acoustic coupling between the drilling fluid and the subsoil formation which has been observed in the vicinity of fractures.

To implement the method an acoustic transmitter/receiver tool such as that illustrated in FIG. 1 is lowered down a borehole by a measured amount. In a variant, a different tool may be used, such as the tool known as a "Digital Sonic Tool". It is considered desirable for the tool to have access to at least three spacings between transmitters and receivers at each depth for which a waveform is observed, and for these spacings to be greater than one meter.

As it is lowered, the tool is caused to transmit sound waves repetitively, either via one of its transducers or else via each of its transducers in succession as defined above. On each occasion the waveforms of the WFn echoes as received by the tool's receivers are recorded together with information about the spacings. Thus, in theory, there is one waveform per spacing at each depth, hence the notation WFn(z).

As described with reference to FIGS. 2A and 2B, the echoes result from acoustic coupling between the tool and the subsoil via the fluid or mud which fills the borehole.

Taking account of the fact that the received data is sampled at varying depths, the waveforms are written WFn(z i). The spacing between two sampling depths z i+1−z i=z is about 15 centimeters and the index n which represents the spacings is variable from 1 to n with m being at least equal to 3.

This data is generally transmitted to the surface where the waveforms may be considered as being acquired, as indicated at step 10 in FIG. 3.

There follows a step 12 which consists, for each waveform WFn(zi) in determining the maximum peak-to-peak amplitude in the waveform in its compression window. The compression window is readily recognized as has been seen with reference to FIG. 2B. The maximum peak-to-peak amplitude may be taken either over all the cycles within the compression window, or else, more simply, by determining the maximum amplitude on the basis of the amplitude of the second or third alternation present in the compression window (p1 FIG. 2B), or by the sum of both of these. Preferably, the resulting amplitude data which is related to a spacing and to a depth is transformed to its logarithm, e.g. base ten. This gives rise to a sequence of logarithmic samples An(zi), which terminates step 12 of FIG. 3.

Such a sequence of samples is analyzed as a table of digital magnitudes. In particular, there are m sequences of digital samples respectively associated with increasing depths. To simplify the explanation, each sequence of samples defined as a function of depth is referred to as a curve.

The method then continues by isolating amplitude peaks having a width close to a predetermined value from each compression amplitude curve (A n(zi)). It currently appears to be desirable to define this predetermined width as corresponding to about one wavelength of the acoustic compression wave in the subsoil, thereby giving a value of 1 foot (0.3 meters) for an acoustic wave at 16 kHz, in particular.

This provides curves of amplitude peaks Pn(zi) associated with the different spacing The presence of fractures is then determined from the curves Pn(z+sn) and Pn(z−sn) where sn designates the half-spacing.

This is now described in more detail with further reference to FIG. 3.

Step 12 is followed by a step 14 which consists in smoothing each of the amplitude curves An(zi) by means of a moving average filter to provide the same number of curves Mn(zi). This smoothing is performed by taking account of the amplitude peaks which are to be retained in the signal.

Typically, when the sampling takes place at depth intervals of 15 centimeters, it appears appropriate to perform the smoothing at step 14 by means of a median filter operating on five depth points, i.e. using two pairs of points on either side of the current point in addition to the current points. Median filters are described in an article by J. B. Bednar, 1983 Applications of Median Filtering to Deconvolution, Pulse Estimation, and Statistical Editing of Seismic Data: Geophysics, 48, pp. 1598 to 1610.

A step 16 then consists in determining the algebraic difference between An(zi) and Mn(zi) which is temporarily written Pn(zi).

Then, a test 18 determines whether the difference is positive or negative or zero. If the difference is positive the quantity Pn(zi) retains the definition given thereto at step 16. If the difference is negative or zero, the value of Pn(zi) is set to 0 in step 20. This may be considered as strict subtraction, i.e. arithmetic subtraction of Mn(zi) from An(zi).

This thus provides a curve of amplitude peaks Pn(zi).

Since there is preferably a plurality of spacings, a step 22 consists not only in initially calculating the curves Pn(zi−sn) and Pn(zi+sn), but also in then using these curves for making comparisons between the results relating to different spacings. Preferably, such comparisons are made by calculating two correlation coefficients as function of depth respectively written T(zi) and R(zi). These coefficients are given by the following equations:

$$<T(z)> = \prod_{n=1}^{n=m} <Pn(z + sn)>$$

$$<R(z)> = \prod_{n=1}^{n=m} <Pn(z - sn)>$$

As will be seen more clearly below in an example, the Applicant has observed that the peaks in the curves T(zi) and R(zi) indicate locations of increased acoustic coupling, i.e. of fractures. The vertical resolution of this method is about the width of one peak, i.e. typically 1 foot (0.3 meters). It may be observed, in comparison with the prior art, that the method of the invention provides depth resolution which is considerably better than the spacing between the transmitter and the receiver.

The method may then be terminated by a step 24 which consists in a combined display of both magnitudes T(zi) and R(zi), preferably together with the amplitude peak curves Pn(zi) applicable to the m spacings available in the tool.

A particular example is now described with reference to FIGS. 4, 4a and 4b.

Figure 4:
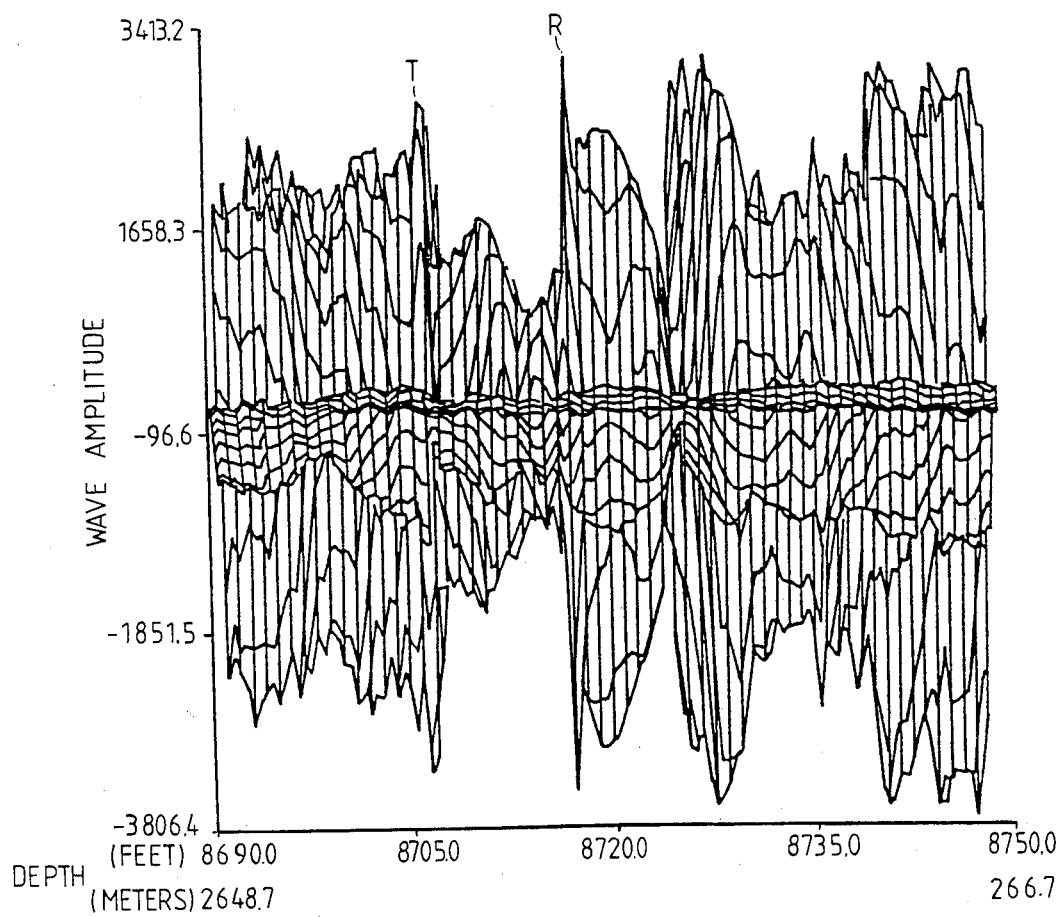
FIG. 4 shows a set of received waveforms WFn in the form of a plane diagram having a three-dimensional effect.

FIG. 4 is a three-dimensional diagram of the waveforms collected by a tool of the above-mentioned type.

The horizontal scale represents depth and the vertical scale represents the wave amplitude. Waveforms relating to a plurality of different times and sampled at 600 to 800 microsecond intervals are displayed together. It can immediately be seen that such curves are difficult to interpret even for the practised person skilled in the art.

Figure 4A:
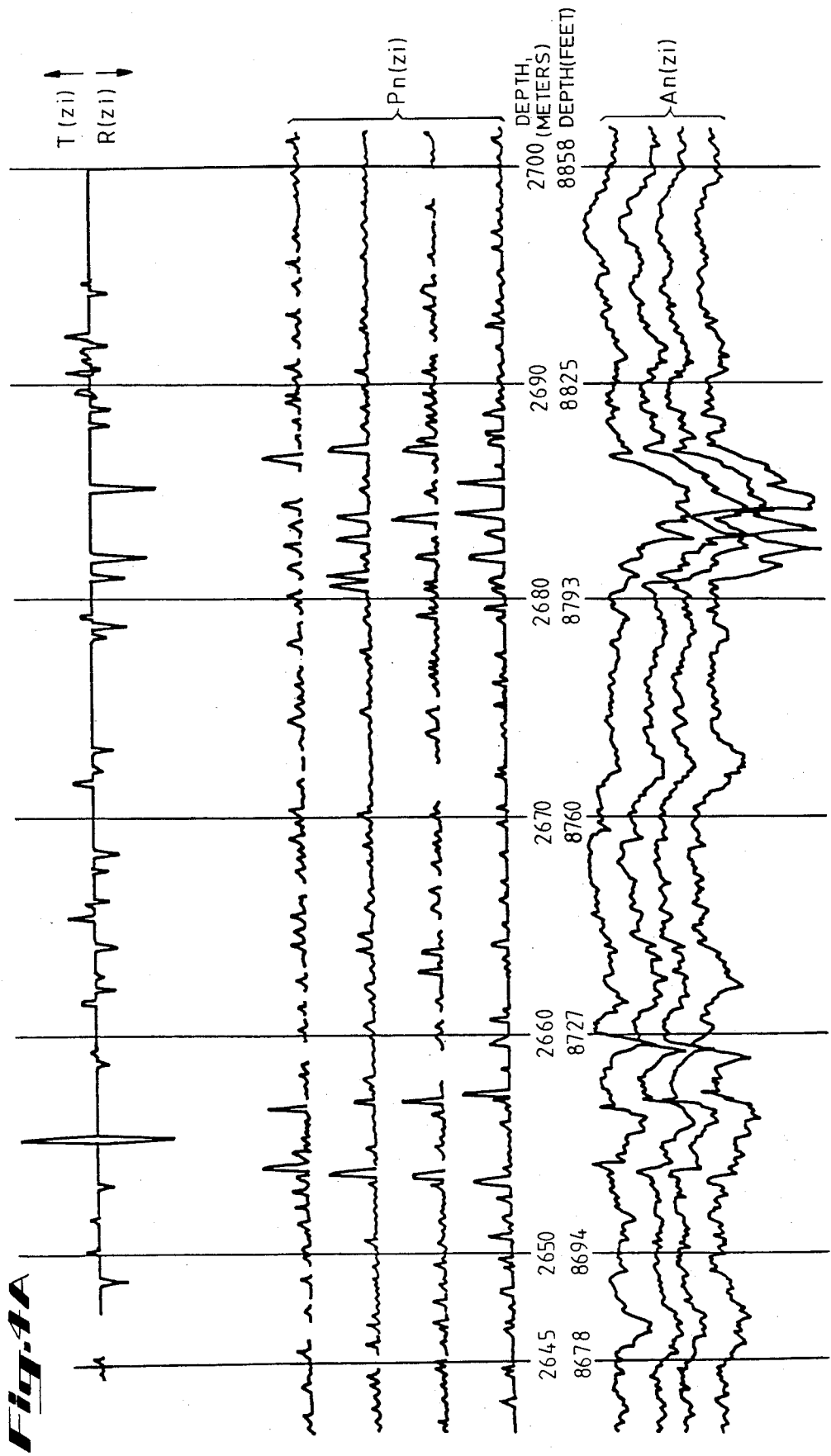
FIGS. 4a and 4b show the received waveforms together with the processing to which they are subjected by implementing the method of amplitude peak analysis.

In FIG. 4a, the bottom curves shows the amplitude of four waveforms obtained using an LSS tool for spacings of 8 and 10 and of 10 and 12 feet. The scale is logarithmic.

The middle portion of FIG. 4a shows the corresponding peak curves Pn(zi).

The top portion shows the two curves T(zi) and R(zi) drawn on opposite sides of a central line.

The section illustrated in FIG. 4 corresponds to a region extending from 8690 feet to 8750 feet and which is included in the wider region shown in FIG. 4a itself extending from 8677 feet (2645 meters) to 8858 feet (2700 meters). It can be seen that the amplitude of the four waveforms demonstrates the behavior described above, i.e.:

the amplitude has two positive peaks at positions where the transmitter or the receiver is located adjacent to the fracture (these peaks are marked T and R respectively in FIG. 4); and the general amplitude level is reduced between these two points.

Thus, at each spacing two peaks are obtained at 8711.6 feet plus or minus one-half spacing, and the T and R curves show two large peaks (3 decibels) at this depth. These peaks thus show up an isolated horizontal fracture.

However, the section lying between 8792.6 and 8815.6 feet on FIG. 4a includes a large drop in amplitude which extends over a zone which is wider than the transmitter to receiver spacing. Three receiver peaks (two high peaks and one lesser peak) are observed. This suggests a fractured zone which contains at least three locations with increased acoustic coupling.

The section going from depths 8819 to 8835 feet suggests the presence of a vertical fracture. One of the advantageous aspects of the invention is that the method also enables vertical fractures to be detected which was practically impossible with prior arts methods because of the attenuation of the received echoes.

Although the phenomena are not simple to model, the Applicant believes, in outline, that the high peaks are generally indicative of horizontal fractures while a series of low peaks appears to indicate a vertical fracture, provided the peaks are accompanied by substantially no attenuation of the received echoes.

Figure 4B:
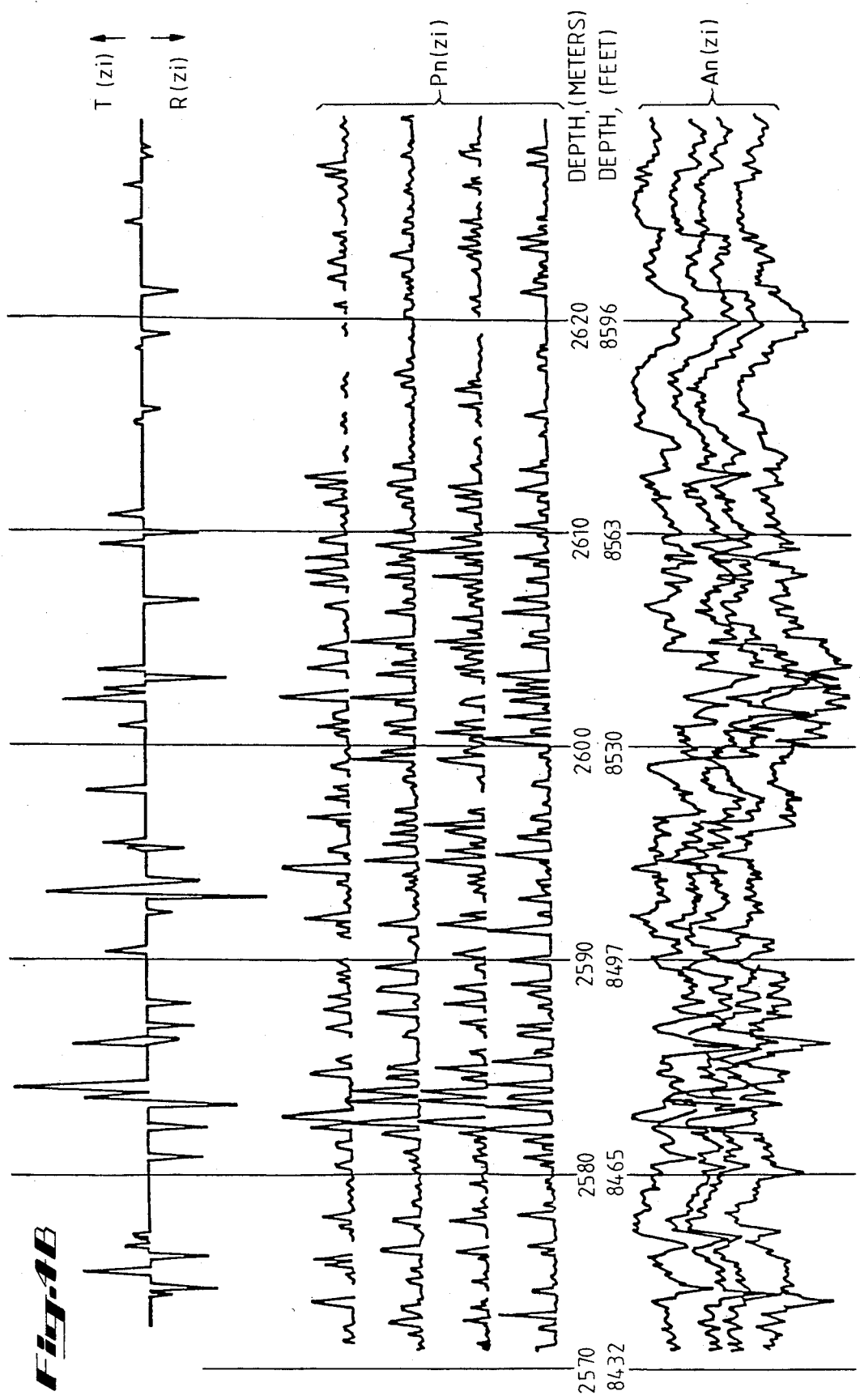

Reference is now made to FIG. 4b which is a continuation of FIG. 4a at shallower depths. In the section lying between 8432 and 8563 feet there is a zone in which the amplitude changes completely erratically. However, the peak analysis technique reduces this inundation of data to a small number of high peaks, which are indicative of a collection of isolated fracture zones.

Other aspects of the method are described further on.

Figure 5:
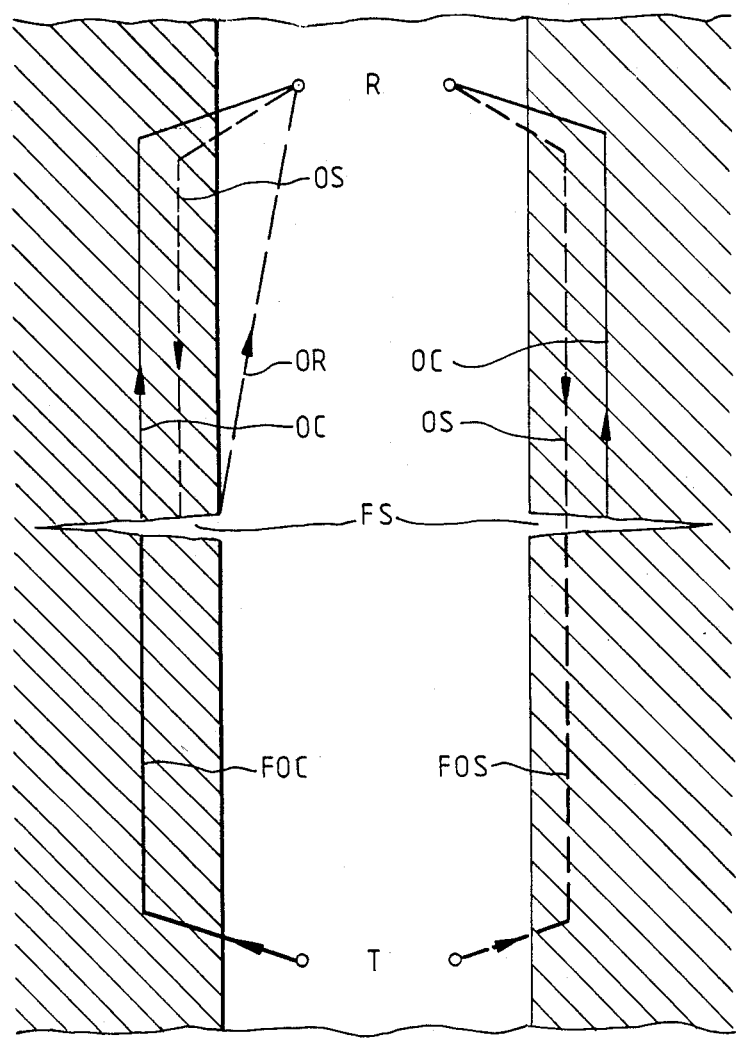
FIG. 5 is a highly diagrammatic drawing showing some of the phenomena which take place at a fracture.

However, reference is initially made to FIG. 5 which serves to explain the changes in propagation mode which may take place around a fracture FS in the subsoil.

This is solely to illustrate the effects of a fracture given that mode conversion takes place each time a wave encounters a frontier between two regions of strong acoustic contrast. Nonetheless, it is believed that fractures produce particularly intense mode conversion, especially between the mode relating to the formation and to the modes relating to the borehole. The reasons are the same as those applicable to obtaining increased acoustic coupling as described above.

To the left of FIG. 5 a compression wavefront FOC encounters a fracture FS situated between the transmitter T and the receiver R. A portion of the incident energy FOC will remain in the form of a compression wave and will thus arrive at the receiver R. Another portion will be converted into a shear wave OS, or else into a wave or in one of the borehole-guided modes, e.g. the Rayleigh mode, the pseudo-Rayleigh mode or the Stoneley mode.

These waves are detected by the receiver R. The shear waves and the guided waves arrive after the compression waves OC which have remained unchanged between the transmitter and the receiver, but they arrive before the corresponding shear or guided modes which have travelled directly all the way from the transmitter to the receiver.

When the tool moves upwardly, the arrival time of these "mode conversion" echoes increases from the pure compression time to reach the pure shear or guided time depending on the fraction of the path which is followed by the converted mode. This fraction varies from 0 to 1.

The echoes which result from conversion from a fast mode to a slow mode (in terms of propagation speed) thus constitute the south-west to north-east arms of the X-shapes formed in the criss-cross pattern.

The north-west to south-east arms of the X-shapes are explained by means of analogous process illustrated in the righthand portion of FIG. 5. In this case, the energy is converted from a slow mode to a fast mode at the fracture. More precisely, a shear wavefront marked FOS arriving at the fracture FS will be partially transformed into faster compression waves OC. A portion of the energy may remain in the form of a slower shear wave OS. A conversion is thus observed from a low mode to a fast mode.

If v and u are used t denote the fast and the slow propagation speeds respectively, and if these speeds are constant within the transmitter to receiver spacing, then the slope p (the time derivative relative to depth) of the arms in the X-shapes will have the amplitude:

$$1/u - 1/v,$$

which is independent of the spacing.

Figure 5A:
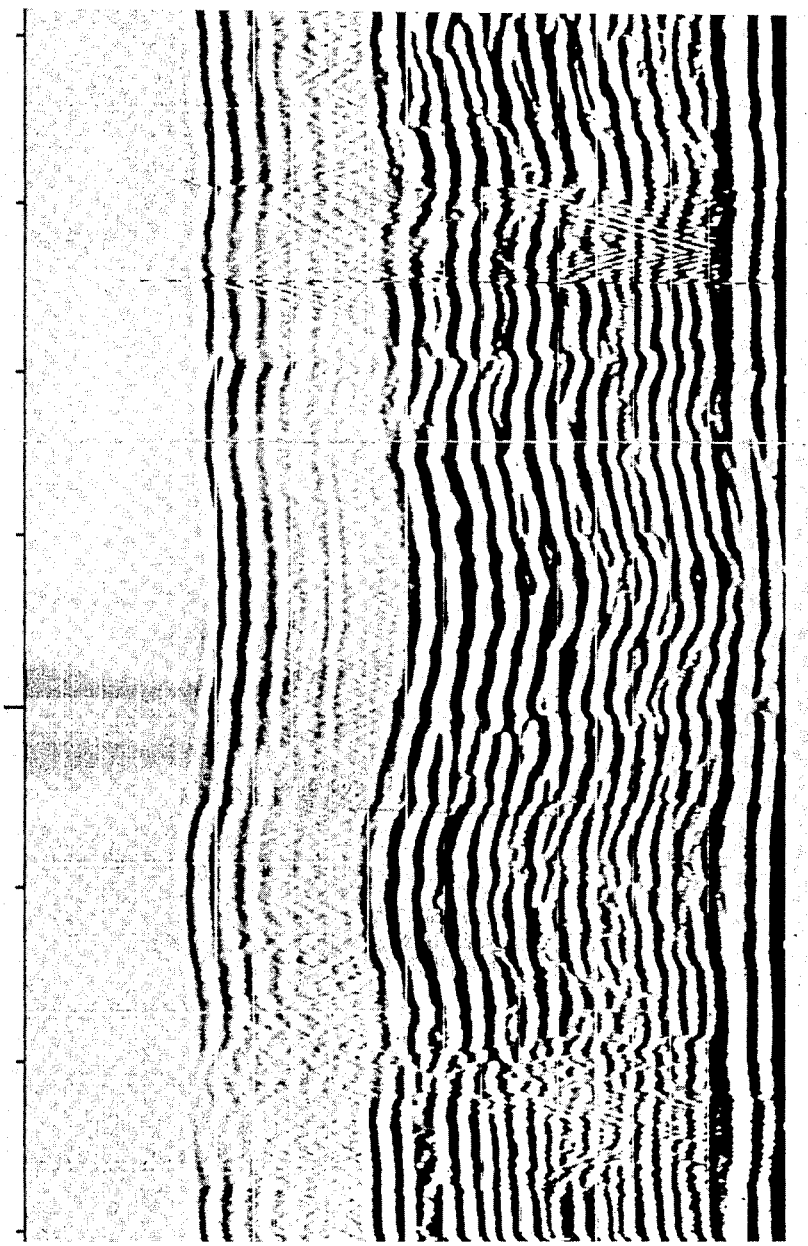
FIGS. 5a and 5b are diagrams of received signals which show various useful phenomena in accordance with the invention and in relation to the criss-cross patterns.
Figure 5B:
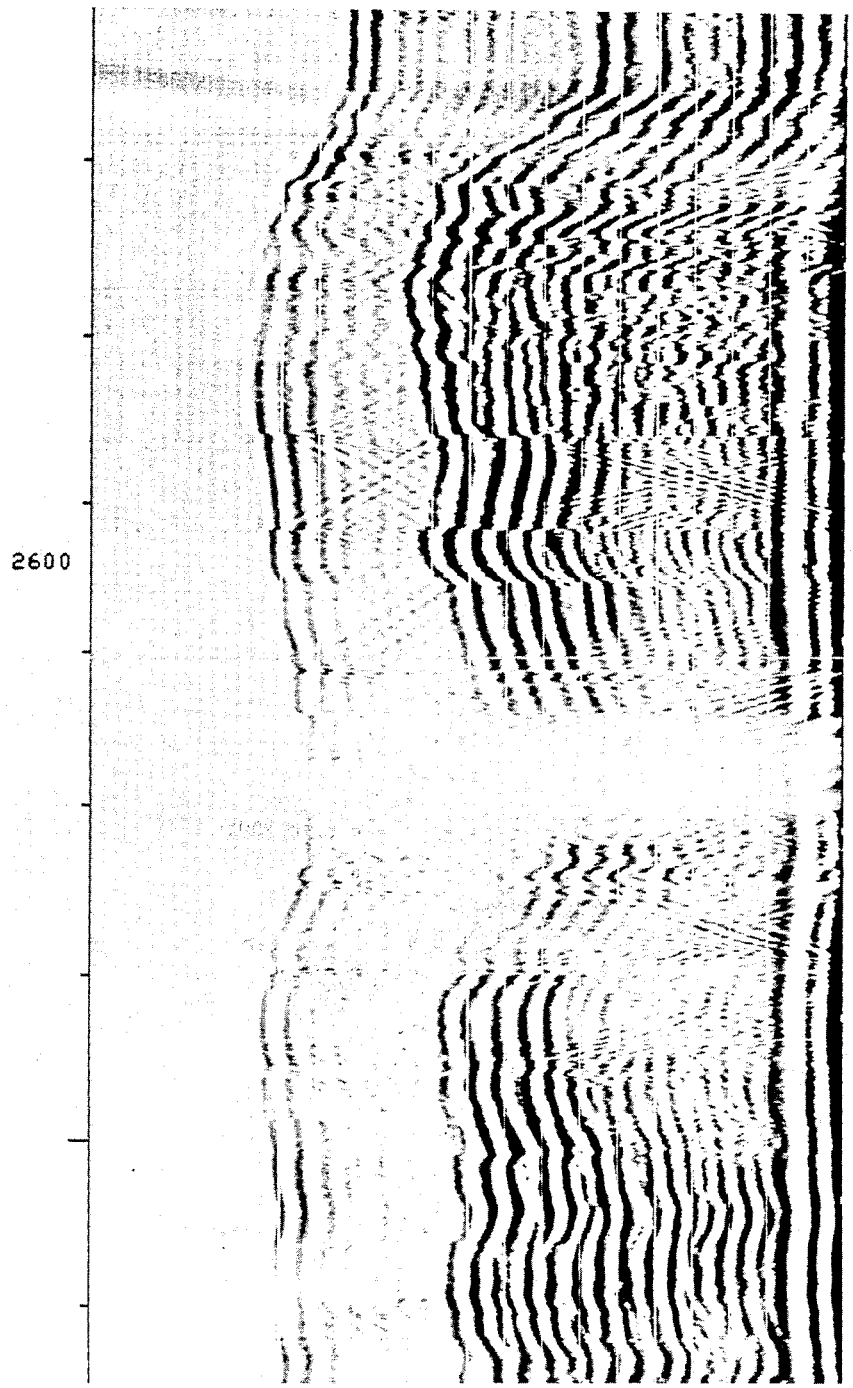

FIGS. 5a and 5b demonstrate typical criss-cross patterns. The Applicant has observed that their main features are as follows:

the pattern extends over a depth equal to the transmitter to receiver spacing;

each pattern is constituted by a plurality of crosses or X-shapes which are superposed on direct echoes;

in the depth direction the arms of the X-shapes always cover the transmitter to receiver spacing; and in the time direction the arms of the X-shapes begin either in the region of compression echoes or else in the region of shear echoes and they end respectively either in the region of shear or pseudo-Rayleigh echoes or else in the region of Stoneley echoes.

Naturally, criss-cross patterns as shown in FIGS. 5a and 5b are accessible to direct visual observation. However, this has appeared to be insufficient for various reasons well-known to the person skilled in the art:

subjective influences, related in particular to the quality of the variable density display and to the choice of gray levels; and the difficulty for an observer, even a practised observer, in ignoring the relative aspect of the criss-cross patterns, which must be related to the level of the background signal. In practice, criss-cross patterns often appear when the direct echoes are weak.

As a result criss-cross patterns are often underestimated, and sometimes they may even pass unseen.

Thus, a second aspect of the invention provides for processing the signals relating to the criss-cross patterns, this processing comprises determining the amplitude and the energy of the criss-cross patterns themselves in comparison with the amplitude or the energy of the direct echoes.

It is preferable, but not absolutely essential, for the portions of the WFn wave forms which are taken into account to be those which are due to compression waves and which terminate with the first echo of the shear wave type or the pseudo-Rayleigh wave type.

Figure 6:
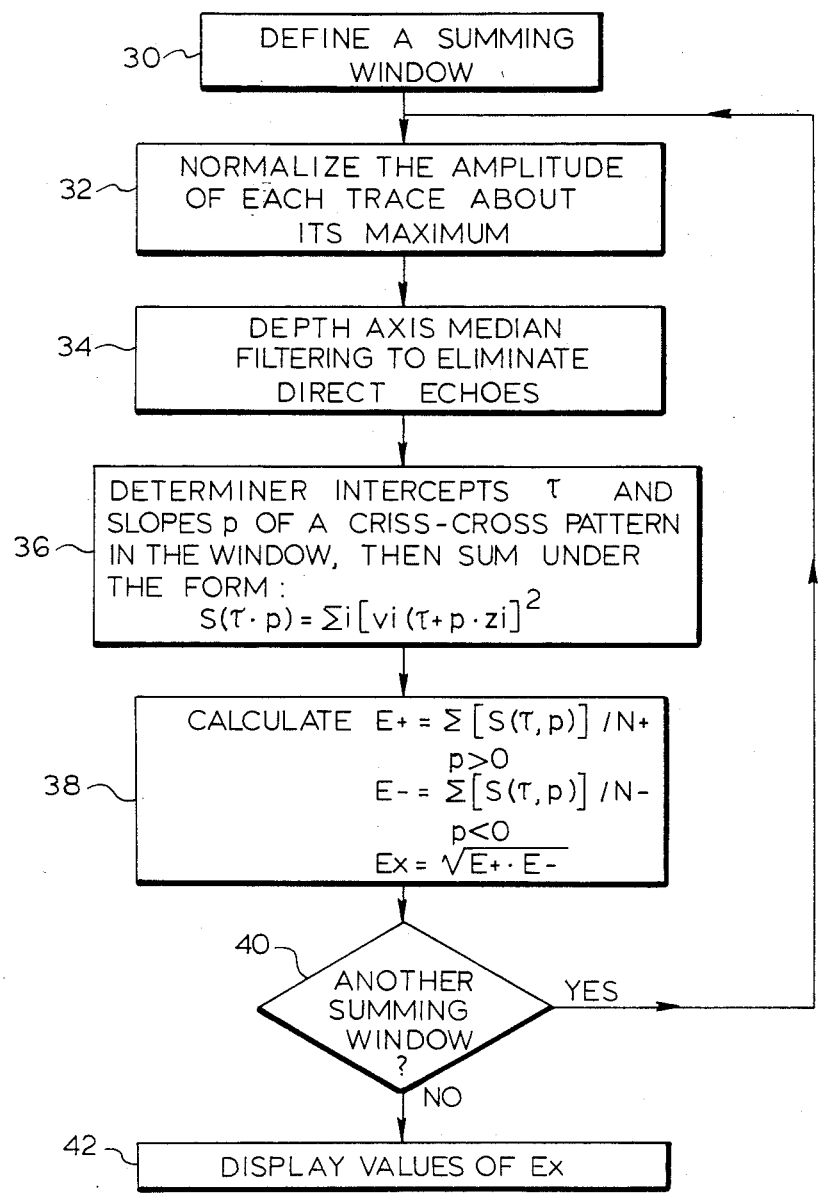
FIG. 6 is a flowchart showing the method of criss-cross pattern processing in accordance with the invention in a specific example.

Reference is now made to FIG. 6.

A first step of the method relating to criss-cross patterns, marked 30, consists in defining a summing window which covers the transmitter to receiver spacing, and which is located, as has just been said, between the compression echoes and the rise of the first pseudo-Rayleigh or shear type echo (see FIG. 2B).

In practice, at each depth, the summing window includes portions of the waveforms situated on each side of the limits up to one-half of the transmitter to receiver spacing. For example, for a spacing of 10 feet (3 meters) 21 waveforms are sampled at 15 centimeter levels for performing the various different calculations for a given depth in order to obtain the magnitude EX defined below. It should be observed that the data obtained in this manner is not equivalent to the amplitude An(z) mentioned above.

Then, a step 32 consists in normalizing the amplitude of each trace relative to its maximum, which is arbitrarily fixed at 1. This ensures that substantially the same weight is given to all the traces in the sum, and at the same time that all the amplitudes in a given trace are related to the strongest direct echoes.

Step 34 then consists in applying depth filtering to eliminate the direct echoes. The filtering is preferably median filtering which is less critical than the preceding filtering and may be performed over five or seven depth points.

There follows a step 36 which consists in determining the time intercepts t and the slope p of a criss-cross pattern in the window.

Sums can then be constructed having the form:

$$S(t,p) = \sigma_i \; Vi \; (t+p.zi)^2$$

in which Vi(t) is the amplitude of the waveform WFn as a function of time at depth Zi, t is the intercept (or intersection) of the sum line with the trace or waveform under consideration in time, while p is the slope of the same sum line.

The person skilled in the art will understand that this amplitude summing also corresponds to energy summing. In practice, a limited set of sum lines is used which have suitable slopes and time intercepts and which extend over the summing window defined at step 20.

Each sum thus corresponds to an arm which is either a rising arm or a falling arm in one of the X-shapes in the criss-cross pattern, supposing there is one.

A step 38 then consists in calculating the sum of the energies relating to the rising arms E+, i.e. the arms for which the slope is positive, and also in summing the energies relating to the falling arm E−, i.e. having a negative slope. In each case the energies are referred to the number of samples taken into consideration which are noted N+ and N− respectively. Each of these magnitudes N is defined as the product of the number of levels situated in the summing window multiplied by the number of summing lines used.

It is then possible to determine the total energy EX contained in the mode conversion of the criss-cross pattern by taking the geometric mean of the magnitude E+ and E−.

If there is a criss-cross pattern, the energy EX is not zero. The energy level corresponds to the proportion of the total sound energy which has been the subject of a mode conversion, thus firstly providing the possibility of detecting a fracture, and secondly giving an indication of the size of the fracture.

Naturally, a step 40 tests to see whether there is another possible summing window, in which case steps 32 to 38 are repeated in this or these other summing window(s).

At the end of the method, a step 42 serves to display the energy EX as determined each time, as a function of the remaining parameter, i.e. as a function of depth.

FIG. 7 shows the summed energy S obliquely, for a position in which the window is more or less centered on the configuration illustrated at a depth of 8710 feet with a spacing of 12 feet (3.6 meters). This figure covers a wide range of slope values and of time intercepts.

It can be seen that S is concentrated in two narrow bands having the following characteristics:

a slope of about 50 microseconds per foot which is the slope of the line joining the compression echo to the first echo of the Rayleigh or shear type;

and a time intercept value which is situated in practice between 900 and 1000 microseconds, which corresponds to the arrival time of the compression echoes.

Measurements were performed with a window moved upwardly in 6 inch (15 centimeters) steps. The result, (not shown) was that the lobes situated at plus or minus 50 microseconds per foot were horizontally shifted to the left and to the right respectively by 25 microseconds. When the window is displaced downwards in 15 centimeter steps, the lobes are again displaced horizontally by 25 microseconds, but in the opposite directions.

These observations show that the lobes observed in magnitude S in FIG. 7 correspond effectively to the arms of an X-shape in a criss-cross pattern.

In practice, this also indicates how much the measurement of the magnitude EX differs from its maximum value when the summing window is not exactly aligned with the criss-cross pattern.

FIGS. 8a and 8b continue from FIG. 7 to shallower depths and show a combination of the results obtained from the methods which form the two aspects of the invention.

The bottom of these figures illustrates the magnitudes T(z) and R(z) obtained as described above.

Immediately above, the next curve shows the variation in the magnitude of the criss-cross pattern energy EX obtained for a 10 foot (3 meter) spacing.

Above there are other measurements described below.

FIGS. 8a and 8b correspond to FIGS. 5a and 5b respectively. There is good agreement between FIGS. 5a and 5b concerning the criss-cross patterns that were already clearly visible in the variable density diagrams. In places where the direct echoes are low and where the criss-cross patterns, if any, are difficult to observe, there can nevertheless be seen a very clear response in the magnitude EX. This constitutes an important advantage of the method according to the second aspect of the invention.

Further, the results of the methods which constitute the two aspects of the invention are in good agreement with one another, since any peak in the magnitude EX coincides in general with an individual peak or a run of peaks in the magnitudes T and R.

However, it may be observed that the magnitude EX does not have such good vertical (i.e. depth) resolution as the peaks in the magnitudes T and S. The resolution of the magnitude EX is thus estimated to be about 2 feet (60 centimeters) for a sampling interval of 6 inches (15 centimeters). However, improved resolution may be obtained by using a depth sampling interval which is smaller.

Going further up FIGS. 8a and 8b there are four more recording tracks, which respectively represent:

track T3 is natural gamma radiation showing both the total curve and the corrected curve (i.e. with the effect of uranium removed);

track T4 is the resistivity of the formation in the following respective modes: deep (dotted line); superficial (dashed line); and spot (continuous line);

track T5 shows the RHOB density of the formation using a gamma radiation tool and the NPHI porosity of the formation using a gamma radiation tool; and track T6 shows the diameter of the borehole measured using a gamma radiation tool (long dashes), and the relative DRHO density measured at 2 different spacings (short dots).

The person skilled in the art will understand that the methods according to the present invention are completely complementary and that they provide data which the prior art means were incapable of supplying; however, they may nonetheless be used in conjunction with prior art measurements as is conventional in subsoil investigations.

I claim:

1. A method of detecting fractures in earth formations penetrated by a borehole, the method comprising the steps of:
   (a) moving a tool through the borehole, the tool possessing transducers for transmitting and for receiving acoustic energy with at least one given transmitter-to-receiver spacing;
   (b) repetitively causing the tool to transmit acoustic energy as it is moved, and recording the acoustic energy received in the form of echo waveforms by a transducer together with the corresponding transmitter-to receiver spacing, these echoes resulting from acoustic coupling between the transducers and the earth formations through the fluid filling the borehole;
   (c) selecting a window in the recorded waveform containing compression wave echoes and extracting therefrom a compression amplitude magnitude An, thereby providing at least one compression amplitude curve as a function of depth An(z), associated with a transmitter-to-receiver half-spacing sn;
   (d) isolating from the compression amplitude curve amplitude peaks having a width close to a predetermined value thereby obtaining at least one amplitude peak curve; and
   (e) determining the presence of fractures from the curves Pn(z+sn) and from the curve Pn(z−sn); wherein step (a) consists in lowering down the borehole a tool suitable for operating simultaneously at a plurality m of spacings, where an designates the half-spacing (with n=1 to m);

step (b) includes selective recording of the waveforms received at each transmission of acoustic energy and at each spacing;

steps (c), and (d) are selectively executed at each spacing to supply a set of compression amplitude curves An(z) and then a set of amplitude peak curves Pn(z) respectively associated with each of the half-spacings sn; and step (e) comprises determining two cross correlation coefficient curves T(z) and R(z) as a function of depth for the curves Pn(z+sn) and Pn(z−sn) respectively by determining the amplitude of the energy of the criss-cross patterns in relation to the amplitude or the energy of the direct echoes wherein the portions of the waveforms taken into account are those portions which are due to the compression waves, and which end at the first shear type wave or the first pseudo-Rayleigh type wave and wherein the processing relating to the criss-cross patterns includes summing the amplitudes taken from the waveforms and relating to the expected positions of the two arms of a criss-cross pattern within a window which covers the transmitter/receiver spacing in order in determine the total energy EX of the echoes on both arms of the criss-cross pattern, the presence of a fracture being determined on the basis of the difference between this total energy and zero.

2. A method according the claim 1, wherein the total energy EX is determined as the geometric mean of energies E+ and E− relating to each of the two arms.

3. A method according to claim 2, wherein that the energies on the rising arms E+ and on the falling arms E− of a criss-cross configuration are determined by the following equations:

$$E+ = sum\ S(t,p)/N + p > 0$$

where N is the product of the number of levels or samples in the accumulation window multiplied by the number of "rising" accumulation lines under consideration and $$E- = sum\ S(t,p)/N - p < 0$$

where N is the product of the number of levels or samples in the accumulation window multiplied by the number of "falling" accumulation lines under consideration and where S(t,p) denotes the square of the sum of the amplitudes along a line which intersects time t with a slope p.

4. A method according to claim 3, wherein the range of values of t used coincide with the compression echo window, while the range of values of coincides with the slopes of the lines joining the compression echoes.

5. A method according to claim 4, wherein the processing relating to the criss-cross patterns comprises the following steps:
   defining a summing window covering the transmitter-to-receiver spacing and extending between compression echoes and the rise of the first pseudo-Rayleigh or shear echo;
   normalizing the amplitude of each waveform relative to the strongest direct echo which it contains;
   eliminating the direct echoes by median filtering in the depth direction;
   determining the summed amplitudes as defined above for a selected set of summing lines having slopes and time intercepts corresponding to a criss-cross pattern in the said window (36);
   determining the magnitudes E+, E− and EX as defined above; and
   repeating the above steps for different admissible positions of the summing window.

6. A method according to claim 5, which further includes displaying the intensity of the criss-cross patterns.

* * * * *